(12) United States Patent
Rashidi et al.

(10) Patent No.: US 12,476,982 B2
(45) Date of Patent: Nov. 18, 2025

(54) METHODS, SYSTEMS, AND APPARATUSES FOR QUERY ANALYSIS AND CLASSIFICATION

(71) Applicant: Comcast Cable Communications, LLC, Philadelphia, PA (US)

(72) Inventors: Bahman Rashidi, Philadelphia, PA (US); Vaibhav Garg, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 349 days.

(21) Appl. No.: 17/355,887

(22) Filed: Jun. 23, 2021

(65) Prior Publication Data
US 2022/0417261 A1 Dec. 29, 2022

(51) Int. Cl.
*H04L 9/40* (2022.01)
*G06F 16/245* (2019.01)
*G06N 20/00* (2019.01)

(52) U.S. Cl.
CPC ........ *H04L 63/1416* (2013.01); *G06F 16/245* (2019.01); *G06N 20/00* (2019.01); *H04L 63/1441* (2013.01); *H04L 2463/144* (2013.01)

(58) Field of Classification Search
CPC ............. H04L 63/1416; H04L 63/1441; H04L 2463/144; H04L 63/1466; H04L 63/1425; H04L 61/4511; H04L 63/1483; G06F 16/245; G06F 16/35; G06N 20/00
See application file for complete search history.

(56) References Cited

U.S. PATENT DOCUMENTS

| | | | |
|---|---|---|---|
| 9,143,522 B2* | 9/2015 | Wang | H04L 63/1416 |
| 9,245,121 B1* | 1/2016 | Luo | H04L 63/14 |
| 9,560,074 B2* | 1/2017 | Stemm | H04L 63/1483 |
| 9,692,771 B2* | 6/2017 | Dinerstein | H04L 63/14 |
| 10,440,042 B1* | 10/2019 | Stein | G06N 20/00 |
| 10,496,924 B1* | 12/2019 | Highnam | H04L 63/1483 |

(Continued)

FOREIGN PATENT DOCUMENTS

| | | | | |
|---|---|---|---|---|
| CN | 107682348 A | * | 2/2018 | .......... H04L 61/1511 |
| CN | 107786575 A | * | 3/2018 | .......... H04L 63/1416 |

(Continued)

OTHER PUBLICATIONS

Hong Zhao et al., "Malicious Domain Names Detection Algorithm Based on N-Gram", Feb. 3, 2019, Journal of Computer Networks and Communications, vol. 2019 (Year: 2019).*

(Continued)

*Primary Examiner* — Zhimei Zhu
(74) *Attorney, Agent, or Firm* — Ballard Spahr LLP

(57) ABSTRACT

Described herein are methods, systems, and apparatuses for query analysis and classification. A plurality of entity identifier queries associated with a plurality of entity identifiers may be received and classified as being legitimate or illegitimate. Illegitimate entity identifier queries may be associated with originating devices that are infected with malware. The originating devices may have sent the illegitimate entity identifier queries in an attempt to communicate with a command and control server(s) of a botnet. Such originating devices may be identified and one or more remedial actions may be performed.

19 Claims, 11 Drawing Sheets

(56) References Cited

U.S. PATENT DOCUMENTS

| | | | |
|---|---|---|---|
| 10,498,751 B2 | 12/2019 | Yu et al. | |
| 10,862,907 B1* | 12/2020 | Pon | G06F 16/955 |
| 11,108,794 B2* | 8/2021 | Manadhata | H04L 61/3025 |
| 2010/0037314 A1* | 2/2010 | Perdisci | H04L 63/1416 |
| | | | 709/217 |
| 2014/0230054 A1* | 8/2014 | Dinerstein | H04L 63/14 |
| | | | 726/22 |
| 2016/0099967 A1* | 4/2016 | Stemm | G06F 21/55 |
| | | | 726/1 |
| 2016/0337391 A1* | 11/2016 | Mckinney | H04L 63/1416 |
| 2016/0352772 A1* | 12/2016 | O'Connor | H04L 63/1483 |
| 2018/0302375 A1* | 10/2018 | Els | H04L 63/0263 |
| 2018/0351972 A1* | 12/2018 | Yu | H04L 63/1416 |
| 2019/0238572 A1* | 8/2019 | Manadhata | H04L 63/1425 |
| 2021/0174199 A1* | 6/2021 | Manadhata | G06N 3/08 |

FOREIGN PATENT DOCUMENTS

| | | | | | |
|---|---|---|---|---|---|
| CN | 113301012 A | * | 8/2021 | ......... | H04L 63/0236 |
| CN | 114866264 A | * | 8/2022 | | |
| WO | WO-2010013228 A1 | * | 2/2010 | ............. | G06F 17/21 |

OTHER PUBLICATIONS

Cheng Qi, Xiaojun Chen, Cui Xu, Jinqiao Shi, Peipeng Liu, "A Bigram based Real Time DNS Tunnel Detection Approach", Procedia Computer Science, vol. 17, pp. 852-860. (Year: 2013).*

Z. Liu, X. Yun, Y. Zhang and Y. Wang, "CCGA: Clustering and Capturing Group Activities for DGA-Based Botnets Detection," 2019 18th IEEE International Conference on Trust, Security and Privacy in Computing and Communications, pp. 136-143 (Year: 2019).*

* cited by examiner

FIG. 5 nGram = "MIC"
Overall Ranking = 6141
502

Dictionary Examples  502A
...
MICROPHONE
MICROSCOPE
MACROECONOMICS
...
THERMODYNAMICS Ranking = 3741

Benign Domain Examples  502B
...
WWW.MICROEXAMPLE.COM
WWW.MICROPHONE.COM
WWW.ECONOMICS.COM
WWW.DYNAMICEXAMPLE.COM
...
Ranking = 8541

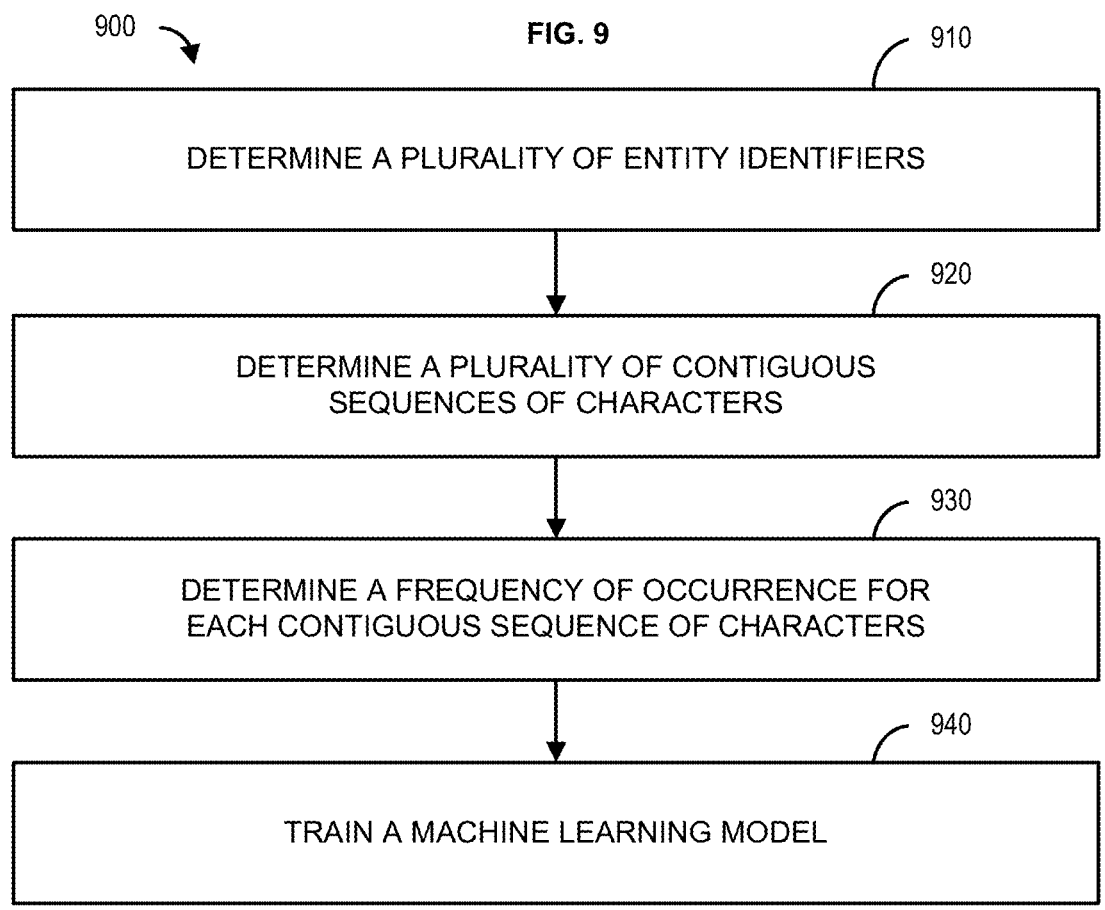

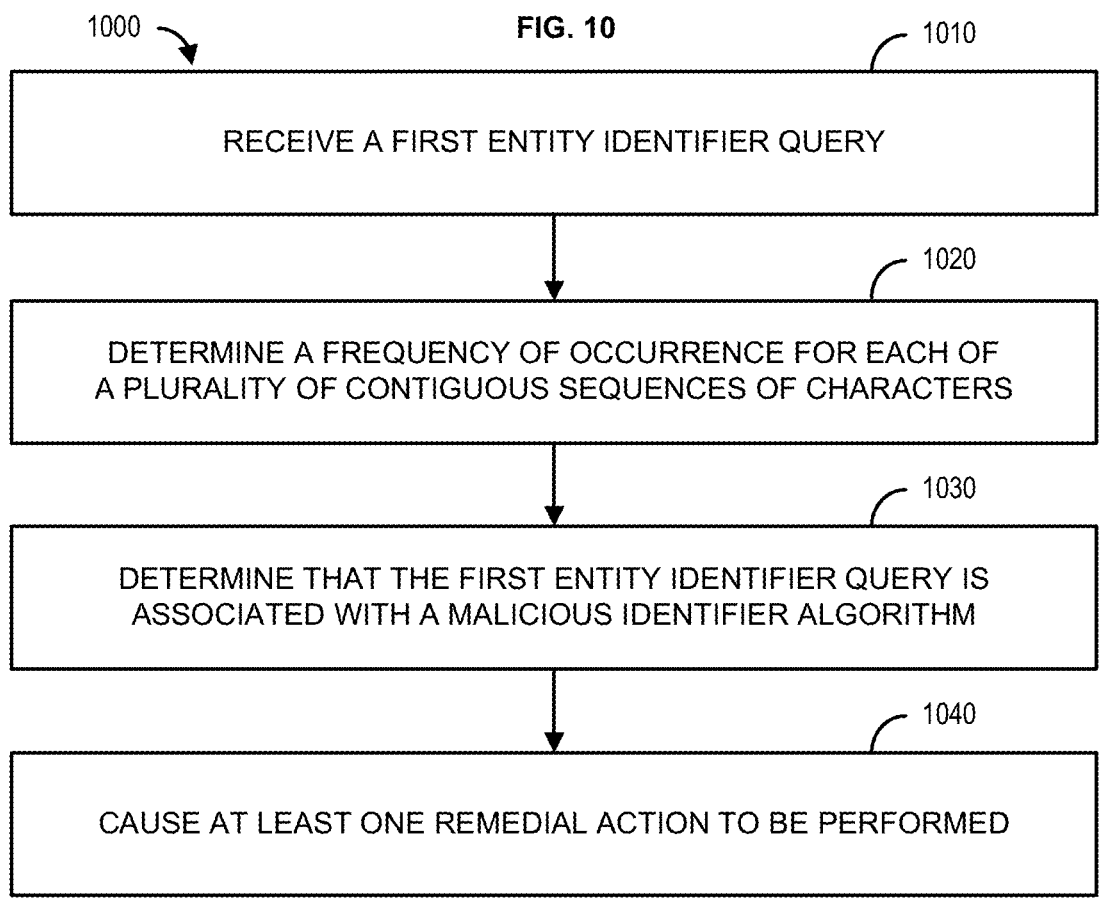

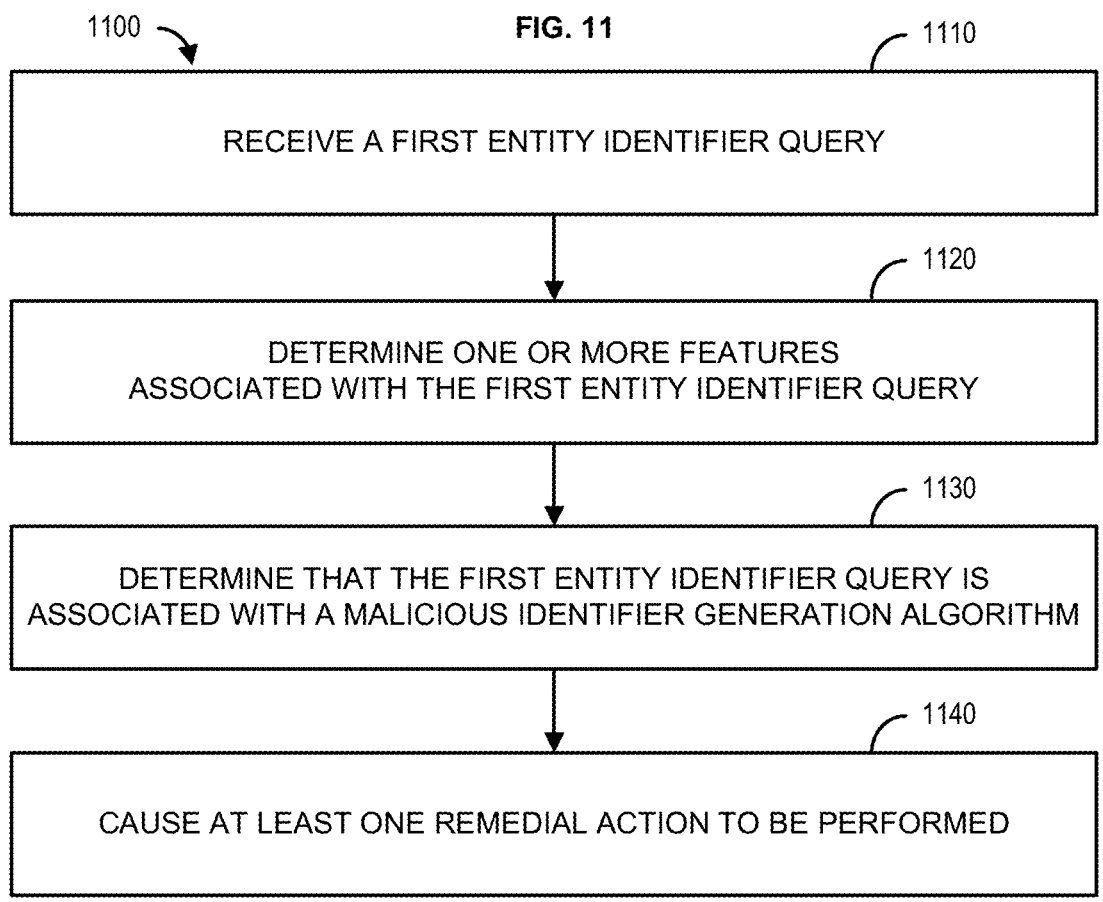

METHODS, SYSTEMS, AND APPARATUSES FOR QUERY ANALYSIS AND CLASSIFICATION

BACKGROUND

Many solutions exist for detecting malicious network activity. These existing solutions include methods of signature detection within code or text as well as methods of anomaly detection in network traffic. Machine learning may be used by some of these existing solutions as well to classify network activity as being malicious or legitimate. However, many of these existing solutions require some level of familiarity with the corresponding malicious code or text, such as a known signature or network traffic pattern, in order to properly classify the network. These and other considerations are described herein.

SUMMARY

It is to be understood that both the following general description and the following detailed description are exemplary and explanatory only and are not restrictive. Described herein are methods, systems, and apparatuses for analysis and classification of entity identifier queries. An entity identifier may identify a device, a domain, a system, etc., and an entity identifier query may be sent by an originating device in order to ascertain an address or pathway for communicating with the device, domain, system, etc. An intermediary device/system may receive such entity identifier queries, and each may be classified as being legitimate or illegitimate.

An illegitimate entity identifier query may comprise an entity identifier that was generated using malware, such as a Domain Generation Algorithm (DGA), and the intermediary device/system may classify the entity identifier query as being illegitimate based on certain features associated with the entity identifier query and/or the entity identifier itself. The intermediary device/system may have received the illegitimate entity identifier query from an originating device that has been infected with malware. For example, the infected originating device may be part of a "botnet," and the illegitimate entity identifier query may be an attempt to communicate with a command and control device of the botnet (e.g., a server). The originating device may be identified, and one or more remedial actions may be performed in response.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 5 shows example contiguous sequences of characters;
FIG. 9 shows a flowchart for an example method;
FIG. 10 shows a flowchart for an example method;
and
FIG. 11 shows a flowchart for an example method.

DETAILED DESCRIPTION

Figure 1:
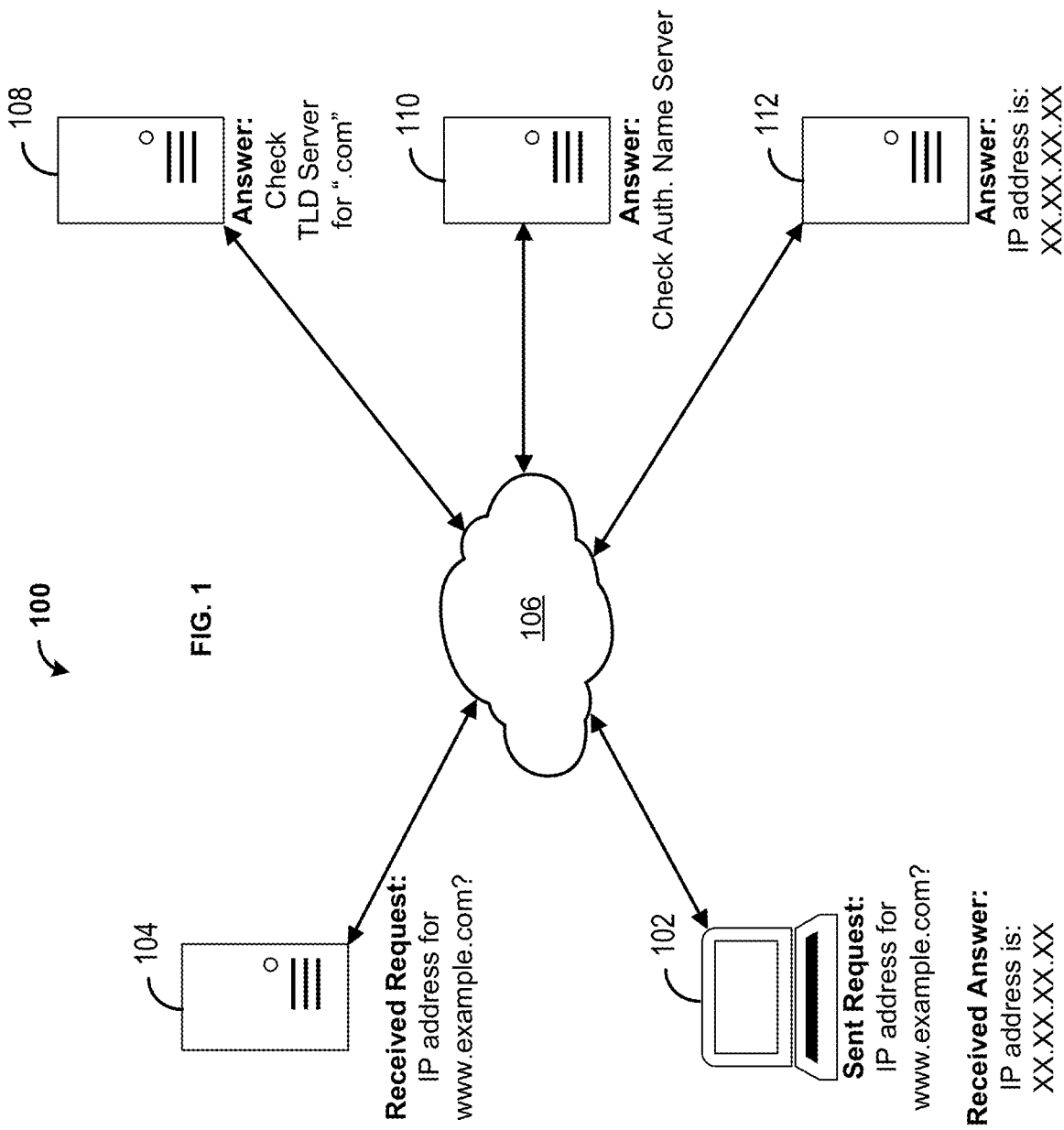
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Malicious network activity takes a variety of forms, ranging from direct network and/or device intrusion (e.g., traditional "hacking") to phishing scams and unwanted emails (e.g., spam). A common drawback among existing solutions for detecting malicious network activity is an inability to detect "unknown unknowns," such as malicious code or text without a known signature or network traffic appearing to be legitimate. An increasingly popular form of malicious network activity relates to "botnets," which are groups of Internet-connected devices infected with malware. Devices within a botnet (referred to herein as "bots") may periodically attempt to reach a "command and control device," such as a server associated with the botnet, in order to receive instructions/tasks to be performed (e.g., attack(s) to be performed, data that is to be stolen/sent, spam emails to be sent, providing bot/network access for an attacker, etc.).

To avoid detection by network administrators and law enforcement, the command and control device may be associated with an entity identifier, such as a domain name (e.g., a website name), that appears to be legitimate. A bot may attempt to reach the command and control device by sending an entity identifier query in order to ascertain an address or pathway for communicating with the command and control device. An intermediary device/system may receive the entity identifier query and resolve (e.g., determine) the address or pathway. For example, the intermediary device/system may comprise a server of a Domain Name System (DNS), and the entity identifier query may comprise a DNS request/query sent by the bot in order to ascertain an internet protocol (IP) address of the command and control device.

The entity identifier may be one of many entity identifiers associated with the command and control device. Such entity identifiers may be generated using malware. For example, the entity identifiers associated with the command and control device may be generated using one or more Domain Generation Algorithms (DGAs), which may automatically generate a large number of entity identifiers (e.g., domain names) that appear to be legitimate and/or similar to known entity identifiers (e.g., whitelisted/allowed domain names). These entity identifiers may be generated using the one or more DGAs in an effort to bypass domain blacklisting and/or other network administration and law enforcement mechanisms for detecting malicious network activity.

The methods, systems, and apparatuses described herein may analyze and classify a plurality of entity identifier queries associated with a plurality of entity identifiers. Each of the plurality of entity identifier queries may be classified as being legitimate or illegitimate based on a plurality of features associated therewith. For example, classification of each entity identifier query may be performed using at least one machine learning model that was trained using the plurality of features. The plurality of features may comprise, for example, contiguous sequences of characters (e.g., sequences of consecutive letters, numbers, etc.) that are present within each entity identifier query. Each of the contiguous sequences of characters may be ranked according to a frequency of occurrence within one or more dictionaries and/or a listing of known entity identifiers. The one or more dictionaries may comprise, for example, language dictionaries, and the listing of known entity identifiers may comprise, for example, known domain names that are not associated with malicious network activity (e.g., "benign" websites/domain names). An entity identifier query that comprises a contiguous sequence(s) of characters with a ranking at or above a threshold may be classified as being legitimate. An entity identifier query that comprises a contiguous sequence(s) of characters with a ranking below the threshold may be classified as being illegitimate.

Illegitimate entity identifier queries may be associated with entity identifiers that were generated using the one or more DGAs, and the particular originating devices that sent the illegitimate entity identifier queries may have been infected with malware, such as malware associated with a botnet. To identify such originating devices, a timestamp and an IP address associated with each of the illegitimate entity identifier queries may be determined. For example, the timestamps and IP addresses associated with each of the illegitimate entity identifier queries may be determined based on a log, database, etc. associated with a device(s) (e.g., a DNS server(s)) that received the illegitimate entity identifier queries. Based on the timestamps and the IP addresses, a Media Access Control (MAC) address associated with each of the originating devices may be determined. For example, the MAC addresses associated with the originating devices may be determined based on a log, database, etc. associated with at least one Dynamic Host Configuration Protocol (DHCP) server. The at least one DHCP server may be associated with the device(s) (e.g., the DNS server(s)) that received the illegitimate entity identifier queries. The log, database, etc. associated with the at least one DHCP server may comprise a MAC-indexed listing of devices, which may be used to determine a profile (e.g., device type, Operating System type, account, hardware, etc.) associated with each of the originating devices.

One or more remedial actions associated with the originating devices may be performed. For example, server responses (e.g., DNS server responses) associated with each of the illegitimate entity identifier queries may be blocked in order to prevent the originating devices from accessing a command and control server associated with the botnet. As another example, each of the MAC addresses and/or IP addresses may be blacklisted (e.g., prevented from sending/ receiving further entity identifier queries). As a further example, any entity identifier (e.g., domain name) associated with any of the illegitimate entity identifier queries may be blacklisted (e.g., prevented from sending and/or receiving network communications) and/or network traffic associated therewith may be monitored. Other remedial actions are possible as well.

FIG. 1 shows an example system 100 for query analysis and classification. The system may 100 receive a plurality of entity identifier queries. The system 100 may function as an intermediary system configured to resolve each query of the plurality of entity identifier queries to determine an address or pathway for communicating with a device/system associated with the corresponding entity identifier. An entity identifier may identify a device, a domain, a system, etc. The system 100 may comprise an originating device 102, such as a computing device, a user device, etc. The originating device 102 may send an entity identifier query in order to ascertain an address or the pathway for communicating with a device, a domain, a system, etc. While only the originating device 102 is shown in FIG. 1, it is to be understood that the system 100 may comprise a plurality of originating devices that each send one or more entity identifiers queries that are resolved by the system 100.

For ease of explanation, the system 100 is described herein as being a Domain Name System (DNS). However, it is to be understood that this description is not meant to be limiting. The system 100 may comprise any suitable intermediary device(s) and/or system that may be configured to resolve each of the entity identifier queries and determine an address or pathway for communicating with a device/system associated with the corresponding entity identifier.

The description of the system 100 herein as being a DNS is one such example of a suitable intermediary system. For example, the system 100 may comprise a DNS resolver 104, a root server 108, a top-level domain (TLD) server 110, and an authoritative name server 112. Each of the devices of the system 100 may be in communication via a network 106, such as the Internet. The network 106 may facilitate communication between the originating device 102, the DNS resolver 104, the root server 108, the TLD server 110, and the authoritative name server 112. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent to/by the originating device 102, the DNS resolver 104, the root server 108, the TLD server 110, and/or the authoritative name server 112 via a variety of transmission paths, including wireless paths (e.g., satellite paths, Wi-Fi paths, cellular paths, etc.) and terrestrial paths (e.g., wired paths, a direct feed source via a direct line, etc.).

The originating device 102 may receive a command from a user and/or execute a portion of software that causes the originating device 102 to generate a request to communicate with an entity. The request may comprise an entity identifier query. For example, the request may comprise an entity identifier that identifies a domain, a website name, etc. The originating device 102 may send the request to another device in the system 100 in order to ascertain an address or pathway for communicating with the server, device, etc. associated with the entity identifier. As an example, the entity identifier query may comprise "www.example.com." The originating device 102 may send the request (e.g., the entity identifier query) to the DNS resolver 104 to ascertain the address or pathway for communicating with the server, device, etc. associated with the entity identifier. The address or pathway may comprise an Internet protocol (IP) address for a server that is associated with the entity identifier (the "entity server"). The DNS resolver 104 may receive the request from the originating device 102 and determine whether a server log, such as a DNS cache stored at the DNS resolver 104 (or any other device of the system 100), indicates the IP address for the entity server. The DNS resolver 104 may determine that no record exits in the DNS cache for the entity server, and the DNS resolver 104 may forward the request to the root server 108. The root server 108 may receive the request and determine whether a server log, such as a DNS cache stored at the root server 108 (or any other device of the system 100), indicates the IP address for the entity server. The root server 108 may determine that no record exits in the DNS cache for the entity server, and the root server 108 may instruct the DNS resolver 104 to query the TLD server 110 associated with ".com" websites. (e.g., based on the entity identifier query including ".com"). The DNS resolver 104 may forward the request to the TLD server 110. The TLD server 110 may receive the request and determine whether a server log, such as a DNS cache stored at the TLD server 110 (or any other device of the system 100), indicates the IP address for the entity server. The TLD server 110 may determine that no record exits in the DNS cache for the entity server, and the TLD server 110 may instruct the DNS resolver 104 to query the authoritative name server 112. The DNS resolver 104 may forward the request to the authoritative name server 112. The authoritative name server 112 may receive the request and determine the IP address for the entity server. The authoritative name server 112 may provide the IP address to the DNS resolver 104, which may in turn provide the IP address of the entity server to the originating device 102.

While the description herein indicates that the entity identifier query sent by the originating device 102 is processed by each of the DNS resolver 104, the root server 108, the TLD server 110, and the authoritative name server 112 to ascertain the IP address of the entity server, it is to be understood that any of the server logs at any of the aforementioned devices may indicate the IP address. For example, a server log stored at or otherwise accessible by the DNS resolver 104 may indicate the IP address. In such an example, the entity identifier query may not be processed by the root server 108, the TLD server 110, or the authoritative name server 112. Other examples are possible as well (e.g., a server log associated with the root server 108 and/or the TLD server 110) may indicate the IP address.

Figure 2:
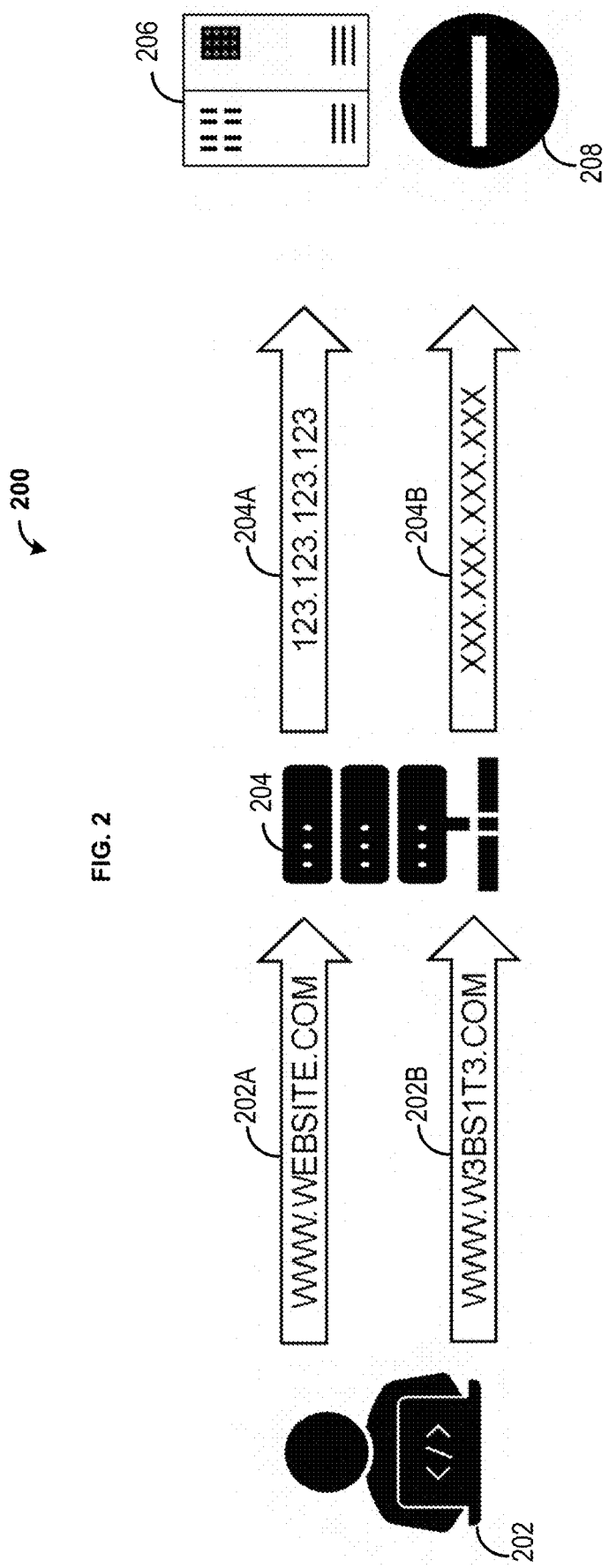
FIG. 2 shows an example system.

The system 100 may be configured to detect malicious network activity associated with any entity identifier query of the plurality of entity identifier queries associated with the plurality of entity identifiers. For example, the DNS resolver 104, the root server 108, the TLD server 110, and/or the authoritative name server 112 may analyze and classify each entity identifier query that is received/processed. For example, FIG. 2 shows a simplified version of the system 100, referred to herein as a system 200. The system 200 may be configured to detect malicious network activity associated with any entity identifier query of the plurality of entity identifier queries associated with the plurality of entity identifiers As shown in FIG. 2, the system 200 may comprise an originating device 202, a server 204, a first entity server 206, and a second entity server 208. The originating device 202 may correspond to the originating device 102. The server 204 may correspond to one or more of the DNS resolver 104, the root server 108, the TLD server 110, or the authoritative name server 112. The first entity server 206 may comprise a legitimate entity server, such as the entity server described herein with respect to FIG. 1. The second entity server 208 may comprise a malicious host server, such as an entity server that has been infected with malware or a server/device associated with a controller of malware. For example, the second entity server 208 may comprise a command and control device associated with a botnet. Infected devices associated with the botnet may attempt to communicate with the second entity server 208 in order to receive instructions/tasks to be performed (e.g., attack(s) to be performed, data that is to be stolen/sent, spam emails to be sent, providing bot/network access for an attacker, etc.).

The originating device 202 may send one or more entity identifier queries to the server 204. For example, as shown in FIG. 2, the originating device 202 may send a first entity identifier query 202A. As further described herein, the server 204 may determine that the first entity identifier query 202A is legitimate. Based on the first entity identifier query 202A being legitimate, the server 204 may send an IP address associated with the first entity server 206 to the originating device 202. The originating device 202 may use the IP address associated with the first entity server 206 for communication.

The originating device 202 may become infected with malware, such as malware associated with a botnet. The malware may cause the originating device 202 to send a second entity identifier query 202B. As further described herein, the server 204 may determine that the second entity identifier query 202B is illegitimate. Based on the second entity identifier query 202B being illegitimate, the server 204 may not send an IP address associated with the second entity server 208 to the originating device 202. For example, based on the second entity identifier query 202B being illegitimate, the server 204 may perform one or more remedial actions as further described herein. The one or more remedial actions may prevent the originating device 202 from communicating with the second entity server 208. By preventing the originating device 202 from communicating with the second entity server 208, the server 204 may prevent confidential information from being stolen, as described herein with respect to FIG. 3.

Figure 3:
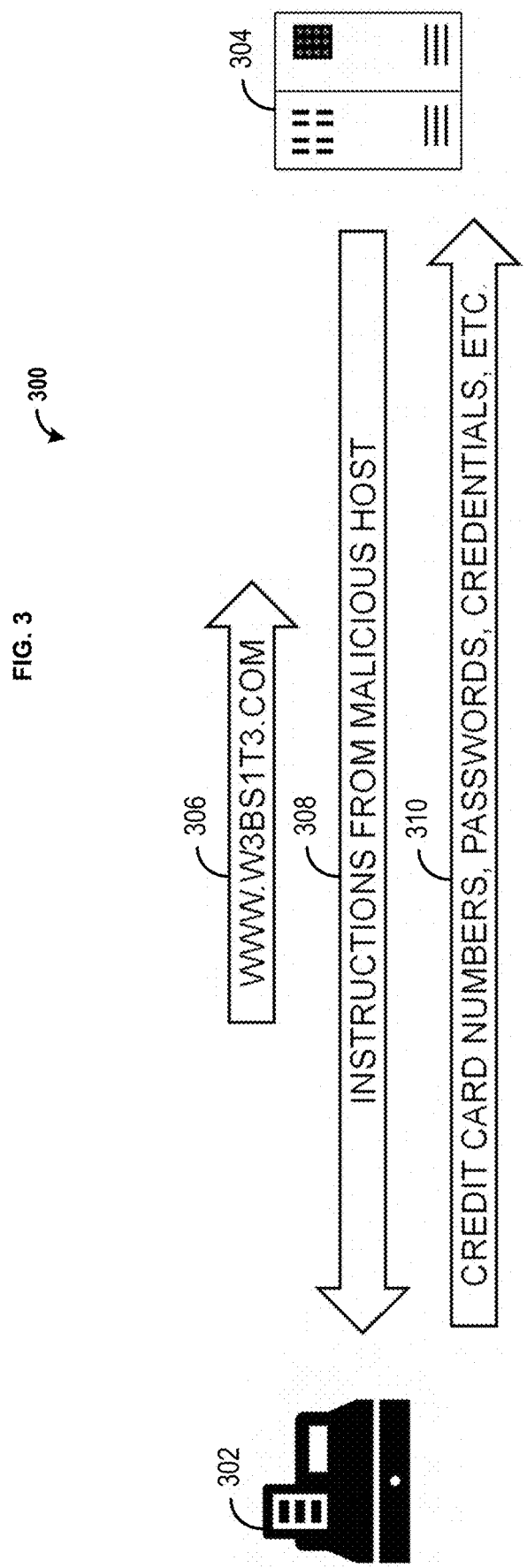
FIG. 3 shows an example system.

FIG. 3 shows an example system 300 comprising an originating device 302 (e.g., the originating device 102 and/or 202) that may be infected with malware. For example, the originating device 302 may comprise a computing device that is used for payment processing, and the malware may cause the originating device 302 to send confidential information to a device(s) associated with the malware (e.g., associated with a hacker, an attacker, etc.). The originating device 302 is described herein as being a computing device used for payment processing as an example only. Other examples are possible as well.

The originating device 302 may attempt to communicate with an entity server 304 associated with the botnet. For example, the originating device 302 may attempt to communicate with an entity server 304 in order to receive instructions/tasks to be performed (e.g., attack(s) to be performed, data that is to be stolen/sent, spam emails to be sent, providing bot/network access for an attacker, etc.). The originating device 302 may send an entity identifier query 306 that identifies a website "www.w3bsit3.com." If an intermediary system/device that receives and processes the entity identifier query 306 does not determine the entity identifier query 306 is illegitimate, then the originating device 302 may receive an IP address or other pathway information for communicating with the entity server 304. In such an example, the entity server 304 may send instructions 308 to the originating device 302. The instructions 308 may cause the originating device 302 to send confidential information 310 to the entity server 304.

As described herein, the system 100 and/or the system 200 may be configured to analyze and classify a plurality of entity identifier queries associated with a plurality of entity identifiers. Each of the plurality of entity identifier queries may be classified as being legitimate or illegitimate. Legitimate entity identifier queries may comprise identifiers associated with benign domains, websites, servers, etc. Illegitimate entity identifier queries may be associated with malicious domains, websites, servers, etc. For example, the plurality of entity identifiers may comprise a plurality of domain names. The system 100 and/or the system 200 may receive and/or determine (e.g., select) the plurality of entity identifiers based on a plurality of Domain Name System (DNS) server records. The plurality of DNS server records may comprise a plurality of legitimate DNS queries associated with a plurality of allowed domain names (e.g., known, benign domain names). The system 100 and/or the system 200 may determine the plurality of entity identifiers based on the plurality of legitimate DNS queries associated with the plurality of allowed domain names. The plurality of DNS server records may comprise at least one of: a plurality of top-level domain server records, a plurality of root server records, or a plurality of authoritative name server records.

Illegitimate entity identifier queries may comprise entity identifiers that were generated using a malicious identifier generation algorithm. The malicious identifier generation algorithm may comprise, as an example, a type of malware known as "Domain Generation Algorithms" (DGA). Attackers associated with a botnet, for example, may use one or more DGAs to generate entity identifiers associated with illegitimate entity identifier queries. For example, attackers associated the botnet may use the one or more DGAs to generate the entity identifiers to avoid detection by network administrators and law enforcement. The entity identifiers associated with the illegitimate entity identifier queries may appear to be legitimate and/or similar to known entity identifiers, such as domain names that are not associated with malicious network activity (e.g., "benign" websites/domain names). The entity identifiers associated with the illegitimate entity identifier queries may be associated with one or more command and control devices associated with the botnet (e.g., the second entity server 208). Infected devices associated with the botnet (e.g., infected originating devices) may attempt to communicate with the one or more command and control devices in order to receive instructions/tasks to be performed (e.g., attack(s) to be performed, data that is to be stolen/sent, spam emails to be sent, providing bot/network access for an attacker, etc.).

Figure 4:
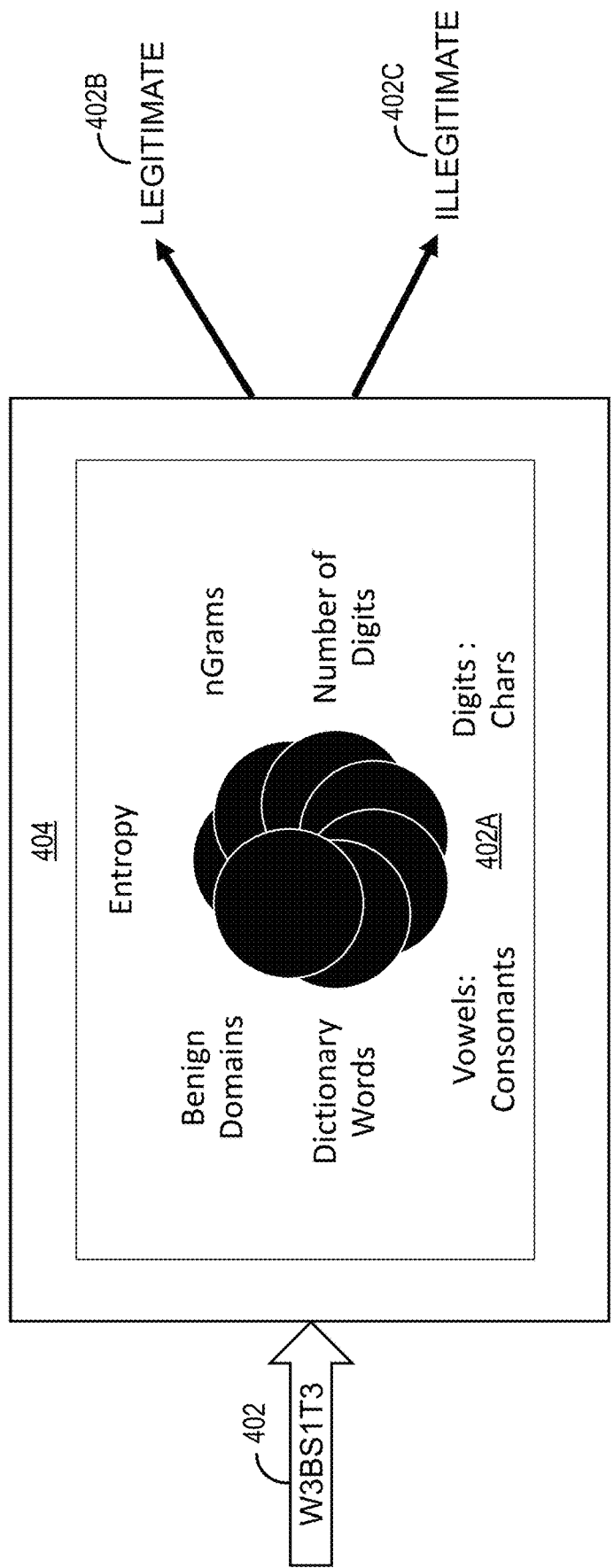
FIG. 4 shows an example classification module.

As described herein, the system 100 and/or the system 200 may be configured to analyze and classify the plurality of entity identifier queries associated with the plurality of entity identifiers. For example, the DNS resolver 104, the root server 108, the TLD server 110, the authoritative name server 112, and/or the server 204 may comprise a classification module. The classification module may be configured to analyze and classify the plurality of entity identifier queries associated with the plurality of entity identifiers. FIG. 4 shows an example classification module 404. An originating device (e.g., the originating device 102, 202, and/or 302) may send an entity identifier query 402. For example, the originating device may have been infected with malware associated with the botnet described herein, and the entity identifier query 402 may identify the command and control device described herein. The entity identifier query 402 may comprise/identify an entity identifier that was generated using the one or more DGAs described herein. For example, as shown in FIG. 4, the entity identifier may comprise "www.w3bsit3.com."

The classification module 404 may receive the entity identifier query 402. The classification module 404 may analyze the entity identifier query 402 and determine it is legitimate or not (e.g., whether "www.w3bsit3.com" is a legitimate entity identifier). For example, the classification module 404 may be configured to classify the entity identifier query 402 as being legitimate or illegitimate based on a plurality of features 402A associated with the entity identifier query 402. The classification module 404 may have been trained using a plurality of training features, as further described herein. For example, the classification module 404 may comprise at least one machine learning model that was trained using the plurality of training features, which may comprise the plurality of features 402A.

The plurality of features 402A may comprise a ratio of vowels to consonants present within the entity identifier query 402. The plurality of features 402A may comprise a ratio of digits to letters present within the entity identifier query 402. The plurality of features 402A may comprise a quantity of numbers present within the entity identifier query 402. The plurality of features 402A may comprise a quantity of letters present within the entity identifier query 402. The plurality of features 402A may comprise a quantity of symbols present within the entity identifier query 402. The plurality of features 402A may comprise a ratio of symbols to letters present within the entity identifier query 402. The plurality of features 402A may comprise a ratio of symbols to numbers present within the entity identifier query 402. The plurality of features 402A may comprise a similarity of the entity identifier query 402 to at least one of a plurality of domain names known to be benign or to be malicious. The plurality of features 402A may comprise an amount (e.g., a level, quantity, etc.) of entropy associated with the entity identifier query 402. For example, the amount of entropy may be based on a distribution of characters present within the entity identifier query 402 and a length of the entity identifier query 402. Other examples for the plurality of features 402A are possible as well.

The plurality of features 402A may comprise one or more contiguous sequences of characters (e.g., sequences of consecutive letters, numbers, etc.) that are present within the entity identifier query 402. For example, the one or more contiguous sequences of characters may comprise one or more "nGrams." An nGram may comprise a contiguous sequence of n items (e.g., characters) from a given sample of text (e.g., the entity identifier query 402 comprising "www.w3bsit3.com"). An nGram of size 1 may be referred to as a "unigram." An nGram of size 2 may be referred to as a "bigram" or a "digram." An nGram of size 3 may be referred to as a "trigram," and so on. English cardinal numbers are sometimes used, e.g., "four-gram", "five-gram", and so on.

Each of the one or more contiguous sequences of characters (nGrams) may be ranked by the classification module 404 and/or by another computing device/module. For example, the classification module 404 and/or another computing device/module may rank each of the one or more contiguous sequences of characters (nGrams) according to a frequency of occurrence within one or more dictionaries and/or a listing(s) of known entity identifiers. The one or more dictionaries may comprise, for example, language dictionaries, and the listing(s) of known entity identifiers may comprise, for example, known domain names that are not associated with malicious network activity (e.g., known "benign" websites/domain names).

FIG. 5 shows an example nGram 502 (e.g., a contiguous sequence of characters), an example portion of a dictionary 502A, and an example portion of a listing of benign domains 502B. The dictionary 502A may comprise, for purposes of explanation and as an example, an English-language dictionary of 1 billion English-language words. Each nGram in the dictionary 502A may be associated with a ranking (e.g., a value associated with the particular nGram). For example, the ranking for a given nGram in the dictionary 502A may correspond to a frequency of occurrence of that particular nGram within the 1 billion English-language words (e.g., the particular nGram appears x times within the 1 billion English-language words). The listing of benign domains 502B may comprise, for purposes of explanation and as an example, a listing of 300 million domains that are known to be legitimate. Each nGram in the listing of benign domains 502B may be associated with a ranking (e.g., a value associated with the particular nGram). For example, the ranking for a given nGram in the listing of benign domains 502B may correspond to a frequency of occurrence of that particular nGram within the 300 million domains that are known to be legitimate (e.g., the particular nGram appears x times within the 300 million domains).

As shown in FIG. 5, the nGram 502 may comprise a trigram (e.g., three letters) of "MIC." As shown in the example portion of the dictionary 502A, the trigram "MIC" may have a ranking of "3741," thereby indicating that the trigram "MIC" appears in 3,741 words out of the 1 billion English-language words in the dictionary 502A. As shown in the example portion of the listing of benign domains 502B, the trigram "MIC" may have a ranking of "8541," thereby indicating that the trigram "MIC" appears within 8,541 of the 300 million domains that are known to be legitimate.

The ranking for any particular nGram determined by the classification module 404 and/or another computing device/module as described herein may correspond to an overall ranking for that nGram (e.g., a value associated with the particular nGram). The overall ranking for a particular nGram may be based on each corresponding ranking for the particular nGram in each of the dictionary 502A and the listing of benign domains 502B. The overall ranking may comprise, for example, an average of each corresponding ranking for the particular nGram in the dictionary 502A and the listing of benign domains 502B; a highest ranking (e.g., the higher of the two rankings corresponding to the dictionary 502A and the listing of benign domains 502B); a lowest ranking (e.g., the higher of the two rankings corresponding to the dictionary 502A and the listing of benign domains 502B); a weighted ranking (e.g., weight x for the ranking corresponding to the dictionary 502A and weight (1-x) for the ranking corresponding to the listing of benign domains 502B); a combination thereof, and/or the like. For example, as shown in FIG. 5, the nGram 502 may be associated with an overall ranking of "6141," which may be based on an average of the dictionary 502A ranking of 3,741 and the listing of benign domains 502B ranking of 8,541.

The classification module 404 may determine the ranking of the nGram 502 (e.g., the overall ranking) based on the dictionary 502A and/or the listing of benign domains 502B (e.g., a value associated with the nGram 502). As discussed above, the ranking of the nGram 502 may be based on a frequency of occurrence of the nGram 502 in the dictionary 502A and/or the listing of benign domains 502B as compared to other nGrams. A higher ranking (e.g., overall frequency of occurrence) may be indicative of a higher likelihood that the entity identifier including the nGram 502 is legitimate. In contrast, a lower ranking (e.g., overall frequency of occurrence) may be indicative of a lower likelihood that the entity identifier including the nGram 502 is legitimate. The classification module 404 may determine that the entity identifier including the nGram 502 is legitimate when the ranking (e.g., the overall frequency of occurrence) meets or exceeds a threshold, the classification module 404 may determine that the entity identifier including the nGram 502 is illegitimate when the ranking is below the threshold. The threshold may comprise a numerical value, such as "6500." For example, the classification module 404 may determine that the entity identifier including the nGram 502 is likely illegitimate because the ranking (e.g., the overall frequency of occurrence) of "6141" associated with the nGram 502 is less than the threshold of "6500."

The threshold may comprise a composite threshold of two numerical values based on the ranking corresponding to the dictionary 502A and the ranking corresponding to the listing of benign domains 502B. For example, the composite threshold may comprise a numerical value of "3,800" for the ranking corresponding to the dictionary 502A and a numerical value of "9,000" for the ranking corresponding to the listing of benign domains 502B. In this example, the classification module 404 may determine that the entity identifier including the nGram 502 is illegitimate because the ranking of 3,741 corresponding to the dictionary 502A is less than 3,800 and ranking of 8,541 corresponding to the listing of benign domains 502B is less than 9,000. Other examples of thresholds are possible as well.

As discussed above, each contiguous sequence of characters (e.g., each nGram) of an entity identifier query may be ranked by the classification module 404 and/or by another computing device/module. While the nGram 502 described above (e.g., a contiguous sequence of characters) comprises the trigram "MIC" (e.g., a prefix), it is to be understood that a ranking may be determined for any contiguous sequence of characters of the entity identifier query 402 regardless of placement within the entity identifier query 402 (e.g., prefix, suffix, root word, etc.). While the example above discusses determining a ranking for only the nGram 502, it is to be understood that a ranking may be determined for as few as one contiguous sequence of characters (e.g., one nGram) of the entity identifier query 402 or for as many as all of the contiguous sequences of characters (e.g., all nGrams) of the entity identifier query 402. Furthermore, each contiguous sequence of characters for which a ranking is determined may vary in length (e.g., nGrams of size 2, size 3, etc.). The classification module 404 may determine that the entity identifier query 402 is illegitimate when the ranking for as few as one contiguous sequence of characters of the entity identifier query 402 or for as many as all of the contiguous sequences of characters of the entity identifier query 402 does not meet or exceed the threshold.

When the classification module 404 determines that the entity identifier query 402 is likely illegitimate based on the ranking (e.g., the entity identifier including the nGram 502 is likely illegitimate), the classification module 404 may identify an originating device associated with the entity identifier query 402. For example, to identify the originating device, the classification module 404 may determine a timestamp and/or an IP address associated with the entity identifier query 402. The timestamp and IP address associated with the entity identifier query 402 may be determined based on a log, database, etc. associated with a device(s) (e.g., a DNS server(s)) that received the entity identifier query 402. Based on the timestamp and the IP address, the classification module 404 may determine a Media Access Control (MAC) address associated with the originating device. For example, the MAC addresses associated with the originating device may be determined by the classification module 404 based on a log, database, etc. associated with at least one Dynamic Host Configuration Protocol (DHCP) server. The at least one DHCP server may be associated with the device(s) (e.g., the DNS server(s)) that received the entity identifier query 402. The log, database, etc. associated with the at least one DHCP server may comprise a MAC-indexed listing of devices, which may be used to determine a profile (e.g., device type, Operating System type, account, hardware, etc.) associated with the originating device.

The the classification module 404 may cause one or more remedial actions associated with the originating device to be performed. For example, the classification module 404 may cause server responses (e.g., DNS server responses) associated with each of the entity identifier query 402 to be blocked in order to prevent the originating device from accessing the command and control device associated with the botnet. As another example, the MAC address and/or IP address may be blacklisted (e.g., prevented from sending/receiving further entity identifier queries). As a further example, the entity identifier (e.g., www.w3bsit3.com) associated with the entity identifier query 402 may be blacklisted (e.g., prevented from sending and/or receiving network communications) and/or network traffic associated therewith may be monitored. Other remedial actions are possible as well.

Figure 6:
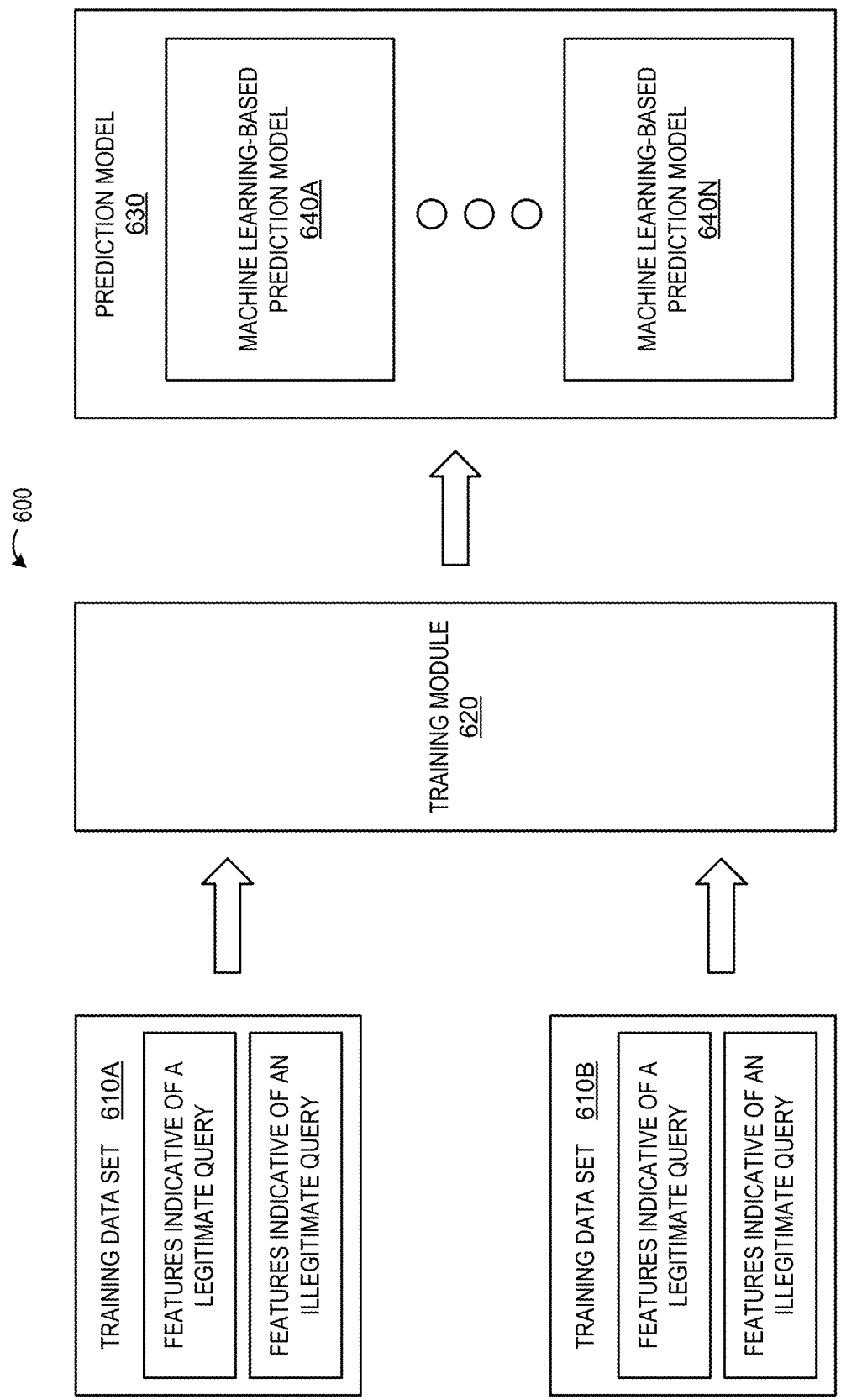
FIG. 6 shows an example system.

As discussed herein, the classification module 404 may have been trained using the plurality of training features described herein. For example, the classification module 404 may comprise at least one machine learning model that was trained using the plurality of training features, which may comprise the plurality of features 402A. The at least one machine learning model that may be used by the classification module 404 may be referred to herein as "at least one prediction model 630" or simply the "prediction model 630." The at least one prediction model 630 may be trained by a system 600 shown in FIG. 6.

The system 600 may be configured to use machine learning techniques to train, based on an analysis of one or more training datasets 610A-610B by a training module 620, the at least one prediction model 630. The at least one prediction model 630, once trained, may be configured to determine a prediction that an entity identifier query is legitimate or illegitimate. A dataset indicative of a plurality of entity identifier queries and a labeled (e.g., predetermined/known) prediction indicating whether the corresponding entity identifiers are legitimate or not may be used by the training module 620 to train the at least one prediction model 630. Each of the plurality of entity identifier queries in the dataset may be associated with a plurality of features that are present within each corresponding entity identifier. The plurality of features and the labeled predictions may be used to train the at least one prediction model 630.

The training dataset 610A may comprise a first portion of the plurality of entity identifier queries in the dataset. Each entity identifier in the first portion may have a labeled (e.g., predetermined) prediction and one or more labeled features. The training dataset 610B may comprise a second portion of the plurality of entity identifier queries in the dataset. Each entity identifier in the second portion may have a labeled (e.g., predetermined) prediction and one or more labeled features. The plurality of entity identifier queries may be randomly assigned to the training dataset 610A, the training dataset 610B, and/or to a testing dataset. In some implementations, the assignment of entity identifiers to a training dataset or a testing dataset may not be completely random. In this case, one or more criteria may be used during the assignment, such as ensuring that similar numbers of entity identifiers with different predictions and/or features are in each of the training and testing datasets. In general, any suitable method may be used to assign the entity identifiers to the training or testing datasets, while ensuring that the distributions of predictions and/or features are somewhat similar in the training dataset and the testing dataset.

The training module 620 may use the first portion and the second portion of the plurality of entity identifier queries to determine one or more features that are indicative of a high prediction. That is, the training module 620 may determine which features present within the plurality of entity identifier queries are correlative with a high prediction. The one or more features indicative of a high prediction may be used by the training module 620 to train the prediction model 630. For example, the training module 620 may train the prediction model 630 by extracting a feature set (e.g., one or more features) from the first portion in the training dataset 610A according to one or more feature selection techniques. The training module 620 may further define the feature set obtained from the training dataset 610A by applying one or more feature selection techniques to the second portion in the training dataset 610B that includes statistically significant features of positive examples (e.g., high predictions) and statistically significant features of negative examples (e.g., low predictions). The training module 620 may train the prediction model 630 by extracting a feature set from the training dataset 610B that includes statistically significant features of positive examples (e.g., high predictions) and statistically significant features of negative examples (e.g., low predictions).

The training module 620 may extract a feature set from the training dataset 610A and/or the training dataset 610B in a variety of ways. For example, the training module 620 may extract a feature set from the training dataset 610A and/or the training dataset 610B using a classification module (e.g., the classification modules 404). The training module 620 may perform feature extraction multiple times, each time using a different feature-extraction technique. In one example, the feature sets generated using the different techniques may each be used to generate different machine learning-based prediction models 640. For example, the feature set with the highest quality features (e.g., most indicative of legitimacy or illegitimacy) may be selected for use in training. The training module 620 may use the feature set(s) to build one or more machine learning-based prediction models 640A-640N that are configured to determine a prediction for a new, unseen entity identifier query.

The training dataset 610A and/or the training dataset 610B may be analyzed to determine any dependencies, associations, and/or correlations between features and the labeled predictions in the training dataset 610A and/or the training dataset 610B. The identified correlations may have the form of a list of features that are associated with different labeled predictions (e.g., legitimate vs. not legitimate). The term "feature," as used herein, may refer to any characteristic of an item of data that may be used to determine whether the item of data falls within one or more specific categories or within a range. By way of example, the features described herein may comprise one or more features present within each of the entity identifier queries that may be correlative (or not correlative as the case may be) with a particular entity identifier query being legitimate or not.

A feature selection technique may comprise one or more feature selection rules. The one or more feature selection rules may comprise a feature occurrence rule. The feature occurrence rule may comprise determining which features in the training dataset 610A occur over a threshold number of times and identifying those features that satisfy the threshold as candidate features. For example, any features that appear greater than or equal to 5 times in the training dataset 610A may be considered as candidate features. Any features appearing less than 5 times may be excluded from consideration as a candidate feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training dataset 610A to generate a first list of features. A final list of features may be analyzed according to additional feature selection techniques to determine one or more candidate feature groups (e.g., groups of features that may be used to determine a prediction). Any suitable computational technique may be used to identify the feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 600. Instead, features may be selected on the basis of scores in various statistical tests for their correlation with the outcome variable (e.g., a prediction).

As another example, one or more candidate feature groups may be selected according to a wrapper method. A wrapper method may be configured to use a subset of features and train the prediction model 630 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate feature groups. Forward feature selection is an iterative method that begins with no features. In each iteration, the feature which best improves the model is added until an addition of a new variable does not improve the performance of the model. As another example, backward elimination may be used to identify one or more candidate feature groups. Backward elimination is an iterative method that begins with all features in the model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method.

Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 620 has generated a feature set(s), the training module 620 may generate the one or more machine learning-based prediction models 640A-640N based on the feature set(s). A machine learning-based prediction model (e.g., any of the one or more machine learning-based prediction models 640A-640N) may refer to a complex mathematical model for data classification that is generated using machine-learning techniques as described herein. In one example, a machine learning-based prediction model may include a map of support vectors that represent boundary features. By way of example, boundary features may be selected from, and/or represent the highest-ranked features in, a feature set.

The training module 620 may use the feature sets extracted from the training dataset 610A and/or the training dataset 610B to build the one or more machine learning-based prediction models 640A-640N for each classification category (e.g., "legitimate entity identifier query" and "illegitimate entity identifier query"). In some examples, the one or more machine learning-based prediction models 640A-340N may be combined into a single machine learning-based prediction model 640 (e.g., an ensemble model). Similarly, the prediction model 630 may represent a single classifier containing a single or a plurality of machine learning-based prediction models 640 and/or multiple classifiers containing a single or a plurality of machine learning-based prediction models 640 (e.g., an ensemble classifier).

The extracted features (e.g., one or more candidate features) may be combined in the one or more machine learning-based prediction models 640A-640N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting prediction model 630 may comprise a decision rule or a mapping for each candidate feature in order to assign a prediction to a class (e.g., legitimate vs. illegitimate). As described herein, the prediction model 630 may be used to determine predictions for entity identifier queries. The candidate features and the prediction model 630 may be used to determine predictions for entity identifier queries in the testing dataset (e.g., a third portion of the plurality of entity identifier queries).

Figure 7:
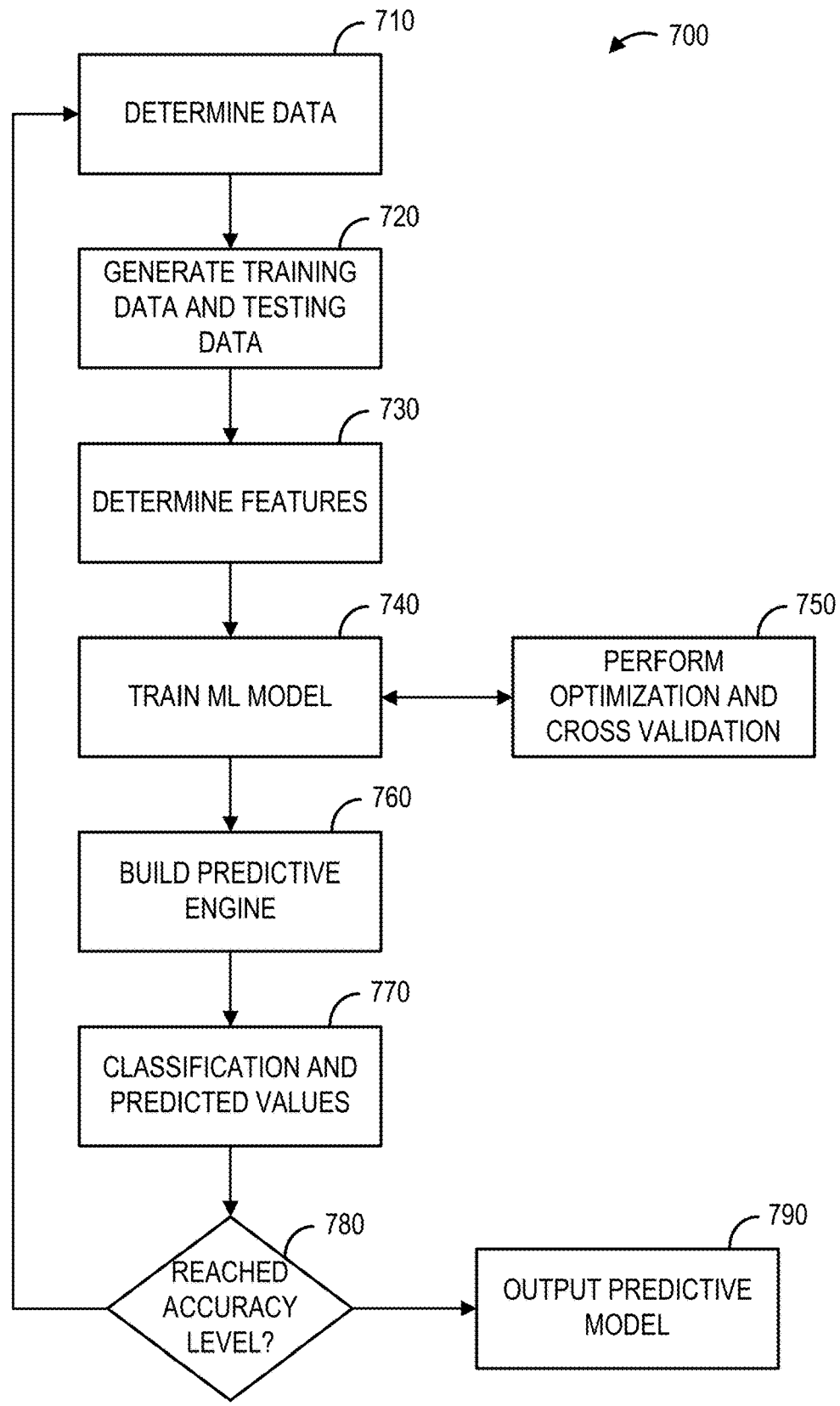
FIG. 7 shows a flowchart for an example method.

FIG. 7 is a flowchart illustrating an example training method 700 for generating the prediction model 630 using the training module 620. The training module 620 may implement supervised, unsupervised, and/or semi-supervised (e.g., reinforcement based) machine learning-based prediction models 640A-640N. The method 700 illustrated in FIG. 7 is an example of a supervised learning method; variations of this example of training method are discussed below, however, other training methods may be analogously implemented to train unsupervised and/or semi-supervised machine learning models. The method 700 may be implemented by the first user device 104, the second user device 108, and/or the server 102.

At step 710, the training method 700 may determine (e.g., access, receive, retrieve, etc.) first entity identifier queries and second entity identifier queries. The first entity identifier queries and the second entity identifier queries may each comprise one or more features and a predetermined prediction. The training method 700 may generate, at step 720, a training dataset and a testing dataset. The training dataset and the testing dataset may be generated by randomly assigning entity identifier queries from the first entity identifier queries and/or the second entity identifier queries to either the training dataset or the testing dataset. In some implementations, the assignment of entity identifier queries as training or test samples may not be completely random. As an example, only the entity identifier queries for a specific feature(s) and/or range(s) of predetermined predictions may be used to generate the training dataset and the testing dataset. As another example, a majority of the entity identifier queries for the specific feature(s) and/or range(s) of predetermined predictions may be used to generate the training dataset. For example, 75% of the entity identifier queries for the specific feature(s) and/or range(s) of predetermined predictions may be used to generate the training dataset and 25% may be used to generate the testing dataset.

The training method 700 may determine (e.g., extract, select, etc.), at step 730, one or more features that may be used by, for example, a classifier to differentiate among different classifications (e.g., predictions). The one or more features may comprise a set of features. As an example, the training method 700 may determine a set features from the first entity identifier queries. As another example, the training method 700 may determine a set of features from the second entity identifier queries. In a further example, a set of features may be determined from other entity identifier queries of the plurality of entity identifier queries (e.g., a third portion) associated with a specific feature(s) and/or range(s) of predetermined predictions that may be different than the specific feature(s) and/or range(s) of predetermined predictions associated with the entity identifier queries of the training dataset and the testing dataset. In other words, the other entity identifier queries (e.g., the third portion) may be used for feature determination/selection, rather than for training. The training dataset may be used in conjunction with the other entity identifier queries to determine the one or more features. The other entity identifier queries may be used to determine an initial set of features, which may be further reduced using the training dataset.

The training method 700 may train one or more machine learning models (e.g., one or more prediction models, neural networks, deep-learning models, etc.) using the one or more features at step 740. In one example, the machine learning models may be trained using supervised learning. In another example, other machine learning techniques may be used, including unsupervised learning and semi-supervised. The machine learning models trained at step 740 may be selected based on different criteria depending on the problem to be solved and/or data available in the training dataset. For example, machine learning models may suffer from different degrees of bias. Accordingly, more than one machine learning model may be trained at 740, and then optimized, improved, and cross-validated at step 750.

The training method 700 may select one or more machine learning models to build the prediction model 630 at step 760. The prediction model 630 may be evaluated using the testing dataset. The prediction model 630 may analyze the testing dataset and generate classification values and/or predicted values (e.g., predictions) at step 770. Classification and/or prediction values may be evaluated at step 780 to determine whether such values have achieved a desired accuracy level. Performance of the prediction model 630 may be evaluated in a number of ways based on a number of true positives, false positives, true negatives, and/or false negatives classifications of the plurality of data points indicated by the prediction model 630.

For example, the false positives of the prediction model 630 may refer to a number of times the prediction model 630 incorrectly assigned a high prediction to an entity identifier query associated with a low predetermined prediction. Conversely, the false negatives of the prediction model 630 may refer to a number of times the machine learning model assigned a low prediction to an entity identifier query associated with a high predetermined prediction. True negatives and true positives may refer to a number of times the prediction model 630 correctly assigned predictions to entity identifier queries based on the known, predetermined prediction for each entity identifier query. Related to these measurements are the concepts of recall and precision. Generally, recall refers to a ratio of true positives to a sum of true positives and false negatives, which quantifies a sensitivity of the prediction model 630. Similarly, precision refers to a ratio of true positives a sum of true and false positives. When such a desired accuracy level is reached, the training phase ends and the prediction model 630 may be output at step 790; when the desired accuracy level is not reached, however, then a subsequent iteration of the training method 700 may be performed starting at step 610 with variations such as, for example, considering a larger collection of entity identifier queries. The prediction model 630 may be output at step 790. The prediction model 630 may be configured to determine predicted predictions for entity identifier queries that are not within the plurality of entity identifier queries used to train the prediction model.

Figure 8:
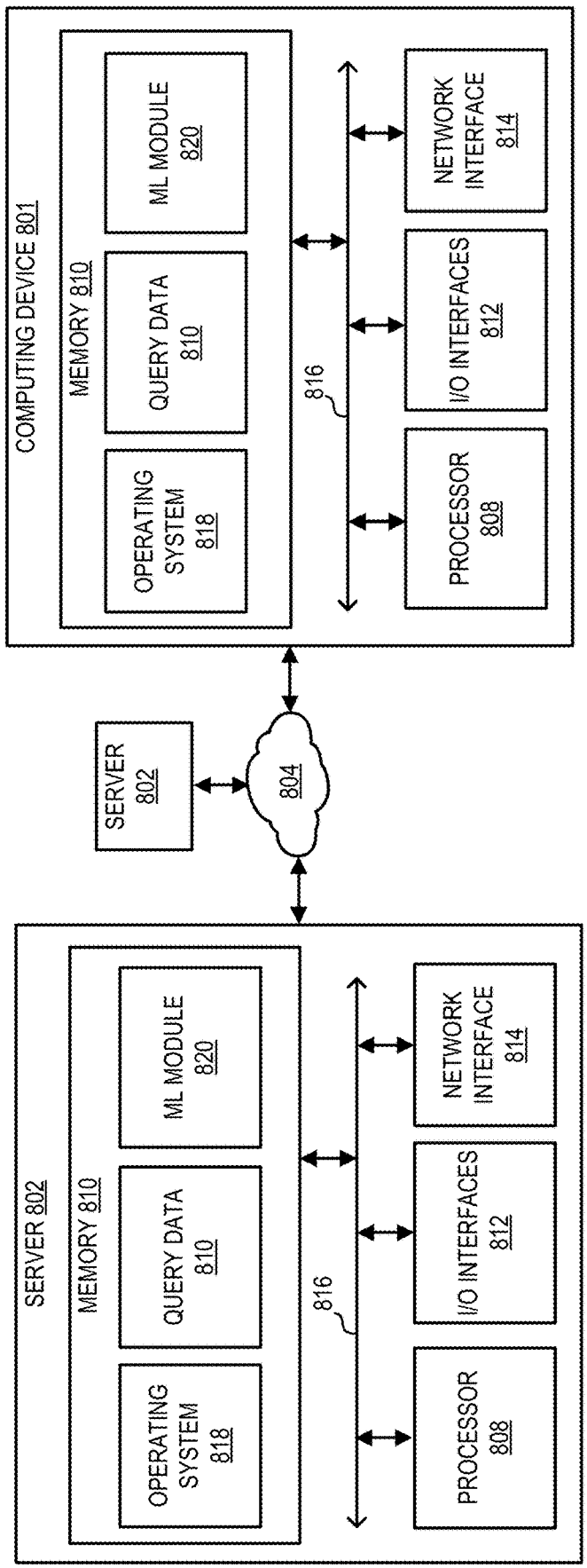
FIG. 8 shows an example system.

As discussed herein, the present methods and systems may be computer-implemented. FIG. 8 shows a block diagram depicting an environment 800 comprising non-limiting examples of a computing device 801 and a server 802 connected through a network 804, such as the network 106. The computing device 801 and/or the server 802 may be any one of the first user device 104, the second user device 108, the server 102, and/or the plurality of sources 101 of FIG. 1. In an aspect, some or all steps of any described method herein may be performed on a computing device as described herein. The computing device 801 may comprise one or multiple computers configured to store one or more of a machine learning module 820, query data 810, and the like. The server 802 may comprise one or multiple computers configured to store one or more of the machine learning module 820, the query data 810, and the like. Multiple servers 802 may communicate with the computing device 801 via the through the network 804.

The computing device 801 and the server 802 may each be a digital computer that, in terms of hardware architecture, generally includes a processor 808, memory system 810, input/output (I/O) interfaces 812, and network interfaces 814. These components (608, 810, 812, and 814) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in memory system 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/or the server 802 is in operation, the processor 808 may be configured to execute software stored within the memory system 810, to communicate data to and from the memory system 810, and to generally control operations of the computing device 801 and the server 802 pursuant to the software.

The I/O interfaces 812 may be used to receive user input from, and/or for providing system output to, one or more devices or components. User input may be received via, for example, a keyboard and/or a mouse. System output may comprise a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 814 may be used to transmit and receive from the computing device 801 and/or the server 802 on the network 804. The network interface 814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 814 may include address, control, and/or data connections to enable appropriate communications on the network 804.

The memory system 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 810 may incorporate electronic, magnetic, optical, and/or other types of storage media. Note that the memory system 810 may have a distributed architecture, where various components are situated remote from one another, but may be accessed by the processor 808.

The software in memory system 810 may include one or more software programs, each of which comprises an ordered listing of executable instructions for implementing logical functions. In the example of FIG. 8, the software in the memory system 810 of the computing device 801 may comprise the training module 320 (or subcomponents thereof), the training data 320, and a suitable operating system (O/S) 818. In the example of FIG. 8, the software in the memory system 810 of the server 802 may comprise, the video data 824, and a suitable operating system (O/S) 818. The operating system 818 essentially controls the execution of other computer programs and provides scheduling, input-output control, file and data management, memory management, and communication control and related services.

For purposes of illustration, application programs and other executable program components such as the operating system 818 are illustrated herein as discrete blocks, although it is recognized that such programs and components may reside at various times in different storage components of the computing device 801 and/or the server 802. An implementation of the training module 620 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

FIG. 9 shows a flowchart of an example method 900 for query analysis and classification. The method 900 may be performed in whole or in part by a single computing device, a plurality of computing devices, and the like. For example, the DNS resolver 104, the root server 108, the TLD server 110, the authoritative name server 112, and/or the server 204 may be configured to perform the method 900. The computing device(s) that performs the steps of the method 900 may comprise a classification module, such as the classification module 404.

At step 910, the computing device may determine a plurality of entity identifiers associated with a plurality of legitimate entity identifier queries. For example, the plurality of entity identifiers may comprise a plurality of domain names. The computing device may determine the plurality of entity identifiers based on a plurality of Domain Name System (DNS) server records. The plurality of DNS server records may comprise a plurality of legitimate DNS queries associated with a plurality of whitelisted domain names (e.g., known, benign domain names). The computing device may determine the plurality of entity identifiers based on the plurality of legitimate DNS queries associated with the plurality of whitelisted domain names. The plurality of DNS server records may comprise at least one of: a plurality of top-level domain server records, a plurality of root server records, or a plurality of authoritative name server records.

At step 920, the computing device may determine a plurality of contiguous sequences of characters (e.g., a plurality of nGrams) associated with (e.g., present within) each of the plurality of entity identifiers. Each contiguous sequence of characters of the plurality of contiguous sequences of characters may be present within at least one entity identifier of the plurality of entity identifiers. For example, at least one entity identifier may comprise "www.microphone-example.com." An example contiguous sequence of characters may comprise the letters "MIC" in the at least one entity identifier (e.g., the nGram 502).

At step 930, the computing device may determine a frequency of occurrence for each contiguous sequence of characters of the plurality of contiguous sequences of characters (e.g., a value indicative of a rank for each contiguous sequence of characters). For example, the computing device may determine a frequency of occurrence of each contiguous sequence of characters of the plurality of contiguous sequences of characters within the plurality of entity identifiers. The computing device may determine a ranking for each contiguous sequence of characters based on the frequency of occurrence of each contiguous sequence of characters.

The computing device may determine the frequency of occurrence of each contiguous sequence of characters of based on at least one dictionary and/or a listing of known entity identifiers. The one or more dictionaries may comprise, for example, language dictionaries, and the listing of known entity identifiers may comprise, for example, known domain names that are not associated with malicious network activity (e.g., "benign" websites/domain names).

At step 940, the computing device may train at least one machine learning model (e.g., the prediction model 630). For example, the computing device may comprise a classification module, such as the classification module 404, and the classification module may be use the at least one machine learning model to classify entity identifiers/entity identifier queries as being legitimate or illegitimate. The computing device may train the at least one machine learning model based on the frequency of occurrence (e.g., ranking) for each contiguous sequence of characters. The at least one machine learning model, once trained, may be configured to detect malicious entity identifier queries. For example, an entity identifier query that comprises a contiguous sequence(s) of characters with a frequency of occurrence (e.g., ranking) above a threshold may be classified as being legitimate and/or a benign entity identifier query, while an entity identifier query that comprises a contiguous sequence(s) of characters with a frequency of occurrence (e.g., ranking) below the threshold may be classified as being illegitimate and/or a malicious entity identifier query The malicious entity identifier query detected by the at least one machine learning model may comprise a domain name that is associated with at least one domain name generation algorithm (DGA).

Attackers associated with a botnet, for example, may use one or more DGAs to generate entity identifiers associated with illegitimate entity identifier queries. For example, attackers associated the botnet may use the one or more DGAs to generate the entity identifiers to avoid detection by network administrators and law enforcement. The entity identifiers associated with the illegitimate entity identifier queries may appear to be legitimate and/or similar to known entity identifiers, such as domain names that are not associated with malicious network activity (e.g., "benign" websites/domain names).

The malicious entity identifier query may have been sent by an originating device infected with malware, such as malware associated with the botnet. To identify the originating device, the computing device may determine a timestamp and an IP address associated with the malicious entity identifier query. For example, the timestamps and IP address associated with the malicious entity identifier query may be determined based on a log, database, etc. associated with a device(s) (e.g., a DNS server(s)) that received the malicious entity identifier query. Based on the timestamps and the IP address, a Media Access Control (MAC) address associated with the originating device may be determined. For example, the MAC address associated with the originating device may be determined based on a log, database, etc. associated with at least one Dynamic Host Configuration Protocol (DHCP) server. The at least one DHCP server may be associated with the device(s) (e.g., the DNS server(s)) that received the malicious entity identifier query. The log, database, etc. associated with the at least one DHCP server may comprise a MAC-indexed listing of devices, which may be used to determine a profile (e.g., device type, Operating System type, account, hardware, etc.) associated with the originating device.

The computing device may perform one or more remedial actions associated with the originating device. For example, server responses (e.g., DNS server responses) associated with each of the malicious entity identifier query may be blocked in order to prevent the originating device from accessing a command and control server associated with the botnet. As another example, the MAC address and/or IP address may be blacklisted (e.g., prevented from sending/receiving further malicious entity identifier queries). As a further example, the entity identifier (e.g., domain name) associated with the malicious entity identifier query may be blacklisted (e.g., prevented from sending and/or receiving network communications) and/or network traffic associated therewith may be monitored. Other remedial actions are possible as well.

FIG. 10 shows a flowchart of an example method 1000 for query analysis and classification. While the method 900 described above uses at least one machine learning model (e.g., the prediction model 630) to determine whether entity identifier queries are malicious, the method 1000 may determine whether entity identifier queries are malicious without using machine learning model. The method 1000 may be performed in whole or in part by a single computing device, a plurality of computing devices, and the like. For example, the DNS resolver 104, the root server 108, the TLD server 110, the authoritative name server 112, and/or the server 204 may be configured to perform the method 1000.

At step 1010, a computing device may receive a first entity identifier query. The first entity identifier query may comprise an entity identifier. The entity identifier may comprise a domain name. The first entity identifier query may be received as a Domain Name System (DNS) server record. The DNS server record may comprise at least one of: a plurality of top-level domain server record, a plurality of root server record, or a plurality of authoritative name server record.

At step 1020, the computing device may determine a frequency of occurrence (e.g., a ranking) for each contiguous sequence of characters (e.g., an nGram) of a plurality of contiguous sequences of characters present within the entity identifier (e.g., a plurality of nGrams). For example, the entity identifier may comprise "www.microphone-example-.com." An example contiguous sequence of characters may comprise the letters "MIC" in the entity identifier (e.g., the nGram 502).

The computing device may determine a frequency of occurrence of each contiguous sequence of characters of the plurality of contiguous sequences of characters within the entity identifier. The computing device may determine the frequency of occurrence (e.g., ranking) for each contiguous sequence of characters based on the frequency of occurrence of each contiguous sequence of characters. The computing device may determine the frequency of occurrence of each contiguous sequence of characters of based on at least one dictionary and/or a listing of known entity identifiers. The one or more dictionaries may comprise, for example, language dictionaries, and the listing of known entity identifiers may comprise, for example, known domain names that are not associated with malicious network activity (e.g., "benign" websites/domain names).

At step 1030, the computing device may determine that the first entity identifier query is associated with a malicious identifier generation algorithm. For example, the computing device may determine that the first entity identifier query is associated with the malicious identifier generation algorithm based on the frequency of occurrence (e.g., ranking) for at least one contiguous sequence of characters of the plurality of contiguous sequences of characters not meeting or exceeding a threshold. The computing device may determine that the frequency of occurrence (e.g., ranking) for the at least one contiguous sequence of characters does not meet or exceed the threshold based on the frequency of occurrence of the at least one contiguous sequence of characters in the at least one dictionary and/or the listing of known entity identifiers (e.g., the frequency of occurrence/ranking of the at least one contiguous sequence of characters in the at least one dictionary and/or the listing of known entity identifiers).

The malicious identifier generation algorithm may comprise at least one domain name generation algorithm (DGA). Attackers associated with a botnet, for example, may use one or more DGAs to generate entity identifiers associated with illegitimate entity identifier queries. For example, attackers associated the botnet may use the one or more DGAs to generate the entity identifiers to avoid detection by network administrators and law enforcement. The entity identifiers associated with the illegitimate entity identifier queries may appear to be legitimate and/or similar to known entity identifiers, such as domain names that are not associated with malicious network activity (e.g., "benign" websites/domain names).

The first entity identifier query may have been sent by an originating device infected with malware, such as malware associated with the botnet. To identify the originating device, the computing device may determine a timestamp and an IP address associated with the malicious entity identifier query. For example, the timestamps and IP address associated with the malicious entity identifier query may be determined based on a log, database, etc. associated with a device(s) (e.g., a DNS server(s)) that received the malicious entity identifier query. Based on the timestamps and the IP address, a Media Access Control (MAC) address associated with the originating device may be determined. For example, the MAC address associated with the originating device may be determined based on a log, database, etc. associated with at least one Dynamic Host Configuration Protocol (DHCP) server. The at least one DHCP server may be associated with the device(s) (e.g., the DNS server(s)) that received the malicious entity identifier query. The log, database, etc. associated with the at least one DHCP server may comprise a MAC-indexed listing of devices, which may be used to determine a profile (e.g., device type, Operating System type, account, hardware, etc.) associated with the originating device.

At step 1040, the computing device may cause at least one remedial action to be performed. For example, the computing device may cause the at least one remedial action to be performed based on the first entity identifier query being associated with the malicious identifier generation algorithm. The at least one remedial action may be associated with the originating device. For example, the computing device may cause server responses (e.g., DNS server responses) associated with the entity identifier query may be blocked in order to prevent the originating device from accessing a command and control server associated with the botnet. As another example, the MAC address and/or IP address may be blacklisted (e.g., prevented from sending/receiving further entity identifier queries). As a further example, the entity identifier (e.g., domain name) may be blacklisted (e.g., prevented from sending and/or receiving network communications) and/or network traffic associated therewith may be monitored. Other remedial actions are possible as well.

FIG. 11 shows a flowchart of an example method 1100 for query analysis and classification. The method 1100 may be performed in whole or in part by a single computing device, a plurality of computing devices, and the like. For example, the DNS resolver 104, the root server 108, the TLD server 110, the authoritative name server 112, and/or the server 204 may be configured to perform the method 1100. The computing device(s) that performs the steps of the method 1100 may comprise a classification module, such as the classification module 404.

At step 1110, a computing device may receive a first entity identifier query. The first entity identifier query may comprise an entity identifier. The entity identifier may comprise a domain name. The first entity identifier query may be received as a Domain Name System (DNS) server record. The DNS server record may comprise at least one of: a plurality of top-level domain server record, a plurality of root server record, or a plurality of authoritative name server record. At step 1120, the computing device may determine one or more features (e.g., a plurality of features) associated with the first entity identifier query. For example, the computing device may comprise a classification model. The classification model may comprise a machine learning model, which may determine the one or more features.

The computing device may determine a frequency of occurrence (e.g., a ranking) for each contiguous sequence of characters (e.g., each nGram) of a plurality of contiguous sequences of characters (e.g., a plurality of nGrams) present within the entity identifier. For example, the entity identifier may comprise "www.microphone-example.com." An example contiguous sequence of characters may comprise the letters "MIC" in the entity identifier (e.g., the nGram 502). The computing device may determine a frequency of occurrence of each contiguous sequence of characters of the plurality of contiguous sequences of characters present within the entity identifier. The computing device may determine the frequency of occurrence (e.g., ranking) for each contiguous sequence of characters based on a frequency of occurrence of each contiguous sequence of characters. The computing device may determine the frequency of occurrence of each contiguous sequence of characters of based on at least one dictionary and/or a listing of known entity identifiers. The one or more dictionaries may comprise, for example, language dictionaries, and the listing of known entity identifiers may comprise, for example, known domain names that are not associated with malicious network activity (e.g., "benign" websites/domain names).

The one or more features may comprise at least the frequency of occurrence (e.g., ranking) for each contiguous sequence of characters of the plurality of contiguous sequences of characters. The one or more features may comprise a ratio of vowels to consonants present within the first entity identifier query. The one or more features may comprise a ratio of digits to letters present within the first entity identifier query. The one or more features may comprise a quantity of numbers present within the first entity identifier query. The one or more features may comprise a quantity of letters present within the first entity identifier query. The one or more features may comprise a quantity of symbols present within the first entity identifier query. The one or more features may comprise a ratio of symbols to letters present within the first entity identifier query. The one or more features may comprise a ratio of symbols to numbers present within the first entity identifier query. The one or more features may comprise a similarity of the first entity identifier query to at least one of a plurality of blacklisted domain names. The one or more features may comprise an amount (e.g., a level, quantity, etc.) of entropy associated with the first entity identifier query. For example, the amount of entropy may be based on a distribution of characters present within the first entity identifier query and a length of the first entity identifier query. Other examples for the one or more features are possible as well.

At step 1130, the computing device may determine that the first entity identifier query is associated with a malicious identifier generation algorithm. For example, the computing device may determine that the first entity identifier query is associated with the malicious identifier generation algorithm based on the one or more features. At least one feature of the one or more features may not meet or exceed a threshold. The threshold may not be met or exceeded (e.g. satisfied) based on the frequency of occurrence and/or the frequency of occurrence (e.g., ranking) of each of the plurality of contiguous sequences of characters.

The malicious identifier generation algorithm may comprise at least one domain name generation algorithm (DGA). Attackers associated with a botnet, for example, may use one or more DGAs to generate entity identifiers associated with illegitimate entity identifier queries. For example, attackers associated the botnet may use the one or more DGAs to generate the entity identifiers to avoid detection by network administrators and law enforcement. The entity identifiers associated with the illegitimate entity identifier queries may appear to be legitimate and/or similar to known entity identifiers, such as domain names that are not associated with malicious network activity (e.g., "benign" websites/domain names).

The first entity identifier query may have been sent by an originating device infected with malware, such as malware associated with the botnet. To identify the originating device, the computing device may determine a timestamp and an IP address associated with the malicious entity identifier query. For example, the timestamps and IP address associated with the malicious entity identifier query may be determined based on a log, database, etc. associated with a device(s) (e.g., a DNS server(s)) that received the malicious entity identifier query. Based on the timestamps and the IP address, a Media Access Control (MAC) address associated with the originating device may be determined. For example, the MAC address associated with the originating device may be determined based on a log, database, etc. associated with at least one Dynamic Host Configuration Protocol (DHCP) server. The at least one DHCP server may be associated with the device(s) (e.g., the DNS server(s)) that received the malicious entity identifier query. The log, database, etc. associated with the at least one DHCP server may comprise a MAC-indexed listing of devices, which may be used to determine a profile (e.g., device type, Operating System type, account, hardware, etc.) associated with the originating device.

At step 1140, the computing device may cause at least one remedial action to be performed. For example, the computing device may cause the at least one remedial action to be performed based on the first entity identifier query being associated with the malicious identifier generation algorithm. The at least one remedial action may be associated with the originating device. For example, the computing device may cause server responses (e.g., DNS server responses) associated with the entity identifier query may be blocked in order to prevent the originating device from accessing a command and control server associated with the botnet. As another example, the MAC address and/or IP address may be blacklisted (e.g., prevented from sending/receiving further entity identifier queries). As a further example, the entity identifier (e.g., domain name) may be blacklisted (e.g., prevented from sending and/or receiving network communications) and/or network traffic associated therewith may be monitored. Other remedial actions are possible as well.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device, a domain name system (DNS) query comprising a domain name;
determining, based on the DNS query, a frequency of occurrence within each of a plurality of references for each contiguous sequence of characters of a plurality of contiguous sequences of characters present within the domain name;
determining, based on the frequency of occurrence for each contiguous sequence of characters, a composite ranking for each contiguous sequence of characters present within the domain name, wherein the composite ranking is based on a plurality of rankings associated with the plurality of references;
determining, based on the composite ranking, that the DNS query is associated with a malicious identifier generation algorithm; and
causing, based on the DNS query being associated with the malicious identifier generation algorithm, at least one remedial action to be performed.

2. The method of claim 1, wherein determining the frequency of occurrence for each contiguous sequence of characters of the plurality of contiguous sequences of characters comprises:
determining, based on a plurality of whitelisted domain names, the frequency of occurrence for each contiguous sequence of characters present within the domain name.

3. The method of claim 1, wherein the malicious identifier generation algorithm comprises a domain name generation algorithm.

4. The method of claim 1, wherein determining that the DNS query is associated with the malicious identifier generation algorithm is based on the composite ranking not satisfying a threshold, and wherein the threshold is a composite threshold based at least in part on the plurality of rankings associated with the plurality of references, wherein at least one of the plurality of references comprises a plurality of contiguous sequences of characters associated with a plurality of whitelisted domain names.

5. The method of claim 1, wherein causing the at least one remedial action to be performed comprises at least one of:
causing a server response associated with the domain name to be blocked;
causing a Media Access Control (MAC) address associated with the DNS query to be blacklisted;
causing an internet protocol (IP) address associated with the DNS query to be blacklisted;
causing the domain name to be blacklisted; or
monitoring network traffic associated with the domain name.

6. The method of claim 1, further comprising:
determining a timestamp and an internet protocol (IP) address associated with the DNS query; and
determining, based on the timestamp and the internet protocol (IP) address associated with the DNS query, and based on at least one Dynamic Host Configuration Protocol (DHCP) server log, a Media Access Control (MAC) address associated with an originating device.

7. The method of claim 6, wherein causing the at least one remedial action to be performed comprises at least one of:
causing the originating device to be blacklisted;
causing at least one other device associated with the originating device to be blacklisted;
sending a message to the originating device; or
monitoring network traffic associated with the originating device.

8. A method comprising:
receiving, by a computing device, a domain name system (DNS) query comprising a domain name;
determining, by a machine learning model, a plurality of features associated with the DNS query, wherein the plurality of features comprises at least a frequency of occurrence for each contiguous sequence of characters of a plurality of contiguous sequences of characters within a plurality of references and a ratio of vowels to consonants present within the domain name;
determining, based on the frequency of occurrence for each contiguous sequence of characters, a composite ranking for each contiguous sequence of characters present within the domain name, wherein the composite ranking is based at least in part on a plurality of rankings associated with the plurality of references;
determining, based on the ratio of vowels to consonants and the composite ranking, that the DNS query is associated with a malicious identifier generation algorithm; and
causing, based on the DNS query being associated with the malicious identifier generation algorithm, at least one remedial action to be performed.

9. The method of claim 8, wherein the machine learning model is configured to detect malicious DNS queries associated with the malicious identifier generation algorithm, and wherein the malicious identifier generation algorithm comprises a domain name generation algorithm.

10. The method of claim 8, wherein the plurality of features comprises at least one of:
- a ratio of digits to letters present within the domain name;
- a quantity of numbers present within the domain name;
- a quantity of letters present within the domain name;
- a quantity of symbols present within the domain name;
- a ratio of symbols to letters present within the domain name;
- a ratio of symbols to numbers present within the domain name;
- a similarity of the domain name to at least one of a plurality of blacklisted domain names; or
- a level of entropy associated with the domain name, wherein the level of entropy is based on a distribution of characters present within the domain name and a length of the domain name.

11. The method of claim 8, wherein determining that the DNS query is associated with the malicious identifier generation algorithm is based on the composite ranking not satisfying a threshold, and wherein the threshold is a composite threshold based at least in part on the plurality of rankings associated with the plurality of references, wherein at least one of the plurality of references comprises a plurality of contiguous sequences of characters associated with a plurality of whitelisted domain names.

12. The method of claim 8, wherein causing the at least one remedial action to be performed comprises at least one of:
- causing a server response associated with the domain name to be blocked;
- causing a Media Access Control (MAC) address associated with the DNS query to be blacklisted;
- causing an internet protocol (IP) address associated with the DNS query to be blacklisted;
- monitoring network traffic associated with the domain name;
- monitoring network traffic associated with a device associated with the DNS query;
- causing the domain name to be blacklisted; or
- monitoring network traffic associated with the domain name.

13. The method of claim 8, wherein determining the composite ranking for each contiguous sequence of characters of the plurality of contiguous sequences of characters comprises:
- determining, based on a plurality of whitelisted domain names, the frequency of occurrence for each contiguous sequence of characters present within the domain name.

14. A method comprising:
- receiving, by a computing device, a domain name system (DNS) query comprising a domain name;
- determining, by a machine learning model, a plurality of features associated with the DNS query, wherein the plurality of features comprises at least a frequency of occurrence for each contiguous sequence of characters of a plurality of contiguous sequences of characters within a plurality of references and a ratio of vowels to consonants present within the domain name;
- determining, based on the frequency of occurrence for each contiguous sequence of characters, a composite ranking for each contiguous sequence of characters present within the domain name, wherein the composite ranking is based at least in part on a plurality of rankings associated with the plurality of references;
- determining, based on the composite ranking and the ratio of vowels to consonants, that the DNS query is not associated with a malicious identifier generation algorithm; and
- causing, based on the DNS query not being associated with the malicious identifier generation algorithm, the DNS query to be processed.

15. The method of claim 14, wherein the machine learning model is configured to detect malicious DNS queries associated with the malicious identifier generation algorithm, and wherein the malicious identifier generation algorithm comprises a domain name generation algorithm.

16. The method of claim 14, wherein the plurality of features comprises at least one of:
- a ratio of digits to letters present within the domain name;
- a quantity of numbers present within the domain name;
- a quantity of letters present within the domain name;
- a quantity of symbols present within the domain name;
- a ratio of symbols to letters present within the domain name;
- a ratio of symbols to numbers present within the domain name;
- a similarity of the domain name to at least one of a plurality of blacklisted domain names; or
- a level of entropy associated with the domain name, wherein the level of entropy is based on a distribution of characters present within the domain name and a length of the domain name.

17. The method of claim 14, wherein determining that the DNS query is not associated with the malicious identifier generation algorithm is based on the composite ranking not satisfying a threshold, and wherein the threshold is a composite threshold based at least in part on the plurality of rankings associated with the plurality of references, wherein at least one of the plurality of references comprises a plurality of contiguous sequences of characters associated with a plurality of whitelisted domain names.

18. The method of claim 14, wherein causing the DNS query to be processed comprises at least one of:
- sending, to a DNS server, the DNS query to ascertain an address associated with the DNS query;
- causing the DNS server to send the DNS query to a root server based on that the address associated with the DNS query does not exist in a cache of the DNS server; or
- causing the DNS server to send the DNS query to a top-level domain (TLD) server based on that the address associated with the DNS query does not exist in a cache of the root server.

19. The method of claim 14, wherein determining the composite ranking for each contiguous sequence of characters of the plurality of contiguous sequences of characters comprises:
- determining, based on a plurality of whitelisted domain names, the frequency of occurrence for each contiguous sequence of characters present within the domain name.

* * * * *